United States Patent
Ishikawa et al.

(12) United States Patent (10) Patent No.: US 9,871,423 B2
(45) Date of Patent: Jan. 16, 2018

(54) ROTARY ACTUATOR VIBRATION CONTROL MECHANISM

(71) Applicants: Toshiyuki Ishikawa, Nihonmatsu (JP); Masayuki Motoyanagi, Nihonmatsu (JP)

(72) Inventors: Toshiyuki Ishikawa, Nihonmatsu (JP); Masayuki Motoyanagi, Nihonmatsu (JP)

(73) Assignee: Oki Micro Engineering Company Limited, Fukushima (JP)

( * ) Notice: Subject to any disclaimer, the term of this patent is extended or adjusted under 35 U.S.C. 154(b) by 336 days.

(21) Appl. No.: 14/773,243

(22) PCT Filed: Mar. 7, 2013

(86) PCT No.: PCT/JP2013/056224
§ 371 (c)(1),
(2) Date: Sep. 4, 2015

(87) PCT Pub. No.: WO2014/136232
PCT Pub. Date: Sep. 12, 2014

(65) Prior Publication Data
US 2016/0020668 A1  Jan. 21, 2016

(51) Int. Cl.
*H02K 33/16* (2006.01)
*H02K 5/24* (2006.01)
*H02K 1/34* (2006.01)

(52) U.S. Cl.
CPC ............... *H02K 5/24* (2013.01); *H02K 1/34* (2013.01); *H02K 33/16* (2013.01)

(58) Field of Classification Search
CPC ........ H02K 33/00–33/18; H02K 35/00; H02K 35/02; H02K 35/04; H02K 35/06; H02K 5/24

(58) Field of Classification Search
USPC ................................................ 310/36–39, 51
See application file for complete search history.

(56) References Cited

U.S. PATENT DOCUMENTS

| 2011/0154922 A1* | 6/2011 | Matsumoto ............ H02K 7/116 74/54 |
| 2013/0249326 A1* | 9/2013 | Kirihara ................. H02K 33/16 310/38 |

FOREIGN PATENT DOCUMENTS

| JP | H10-174409 | 6/1998 |
| JP | H11-178306 | 7/1999 |

* cited by examiner

*Primary Examiner* — Jeremy Luks
(74) *Attorney, Agent, or Firm* — Muramatsu & Associates (57) ABSTRACT

To provide a rotary actuator vibration control mechanism that both reduces vibration during operation and contributes to simplifying the overall structure. In this rotary actuator vibration control mechanism, a continuous shock absorbing member that is integrally formed together with a stopper and an engagement means is laid out in a rotary actuator comprising the following: a case; a rotor that is disposed inside said case and swings back and forth; an output shaft that supports said rotor and outputs the force of the swinging thereof to the outside; the aforementioned stopper, which prescribes the movement path of the rotor inside the case; and the aforementioned engagement means, which engages with an externally attached device disposed outside the case. The shock absorbing member is designed such that the stopper is formed by the molded body that forms the shock absorbing member, and is also designed so as to cover the entire engagement means. The shock absorbing member may be designed such that an integral molded body covers contact parts of both the stopper and the engagement means in a continuous manner, or may be changed to a design in which both are integrally formed by the shock absorbing member.

4 Claims, 6 Drawing Sheets

ROTARY ACTUATOR VIBRATION CONTROL MECHANISM

TECHNICAL FIELD

The present invention relates to a technical field of a rotary actuator, and more particularly, to a vibration control mechanism of a rotary actuator that is mainly focused on prevention of vibration of a rotor that is caused by a rotary oscillation.

BACKGROUND OF THE INVENTION

A rotary actuator (hereinafter referred to as "actuator") as a mechanism to convert input energy into physical rotation force is used in various types of industrial machinery, for example, as a power source of movable mechanism in an ATM device (automatic teller apparatus), printer device, copying machine, facsimile apparatus, or the like.

For the mechanism of the actuator, a mechanism is generally known which uses electromagnetic force as a power source and causes an output shaft to make reciprocating rotary motion (hereinafter referred to as "oscillation") with a predetermined rotary angle. As an example, the applicant of this application has already disclosed this type of mechanism in Patent Document 1.

In the configuration of the actuator according to that application, two magnetic coils having a magnetic core at their center are oppositely laid and spaced with each other, and a permanent magnet is arranged between the magnetic coils with an air gap. The permanent magnet is held by a rotor supported in a cantilevered manner by an output shaft, and is oscillated by the attraction or repulsion to the permanent magnet according to switching of the electromagnetic coil poles, thereby providing an output as a driving force.

Further, as another configuration example, there is an actuator disclosed by Patent Document 2 (rotary solenoid). In that configuration, it is provided with a shaft portion rotatably held by a casing, a movable portion whose one end fixes to the shaft portion and the other end holds a magnet, and a pair of magnetic coils arranged at both sides of the movable portion.

The actuator of the above configuration arranges therein a stopper in the casing that limits a movement of the rotor. The stopper can be a cause of vibration and noise due to contact or collision of the rotor. Accordingly, a shock-absorbing member that has anti-vibration or vibration absorbing properties covers the stopper, or the stopper itself is made of a shock-absorbing member.

PRIOR ART LITERATURE

Patent Documents

Patent Document 1: Japanese Patent Laid-Open Publication No. H10-174409 (page 2, FIG. 1)
Patent Document 2: Japanese Patent Laid-Open Publication No. H11-178306 (pages 3 to 4, and FIG. 6)

SUMMARY OF THE INVENTION

Problems to be Solved by the Invention

Figure 6:
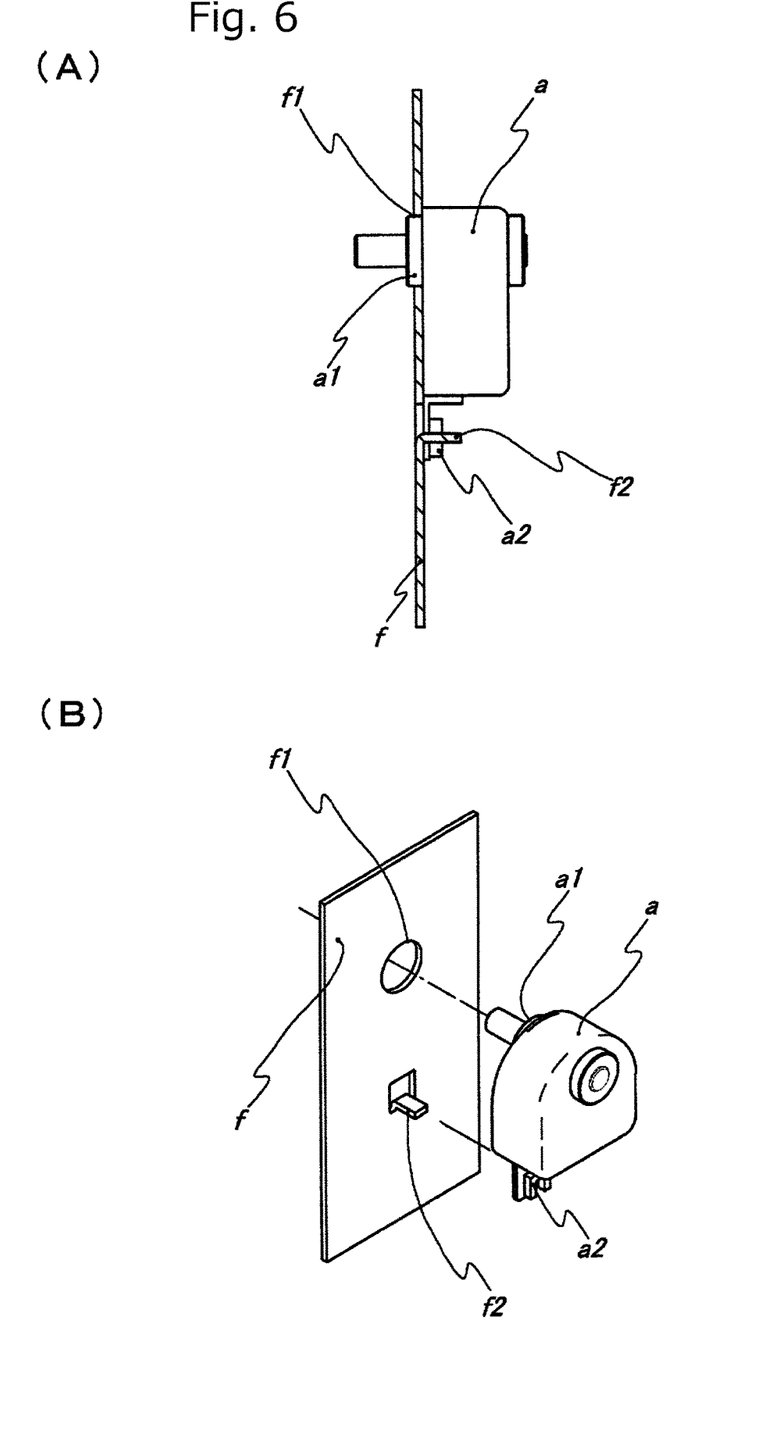
FIG. 6(A) is a perspective view and FIG. 6(B) is an assembly perspective view showing the conventional anti-vibration actuator mechanism.

These actuators are installed as a drive source to industrial equipment, such as an ATM device, printer device, copying machine, or facsimile apparatus, etc (hereinafter referred to as "mounting device"). In general, the installation is made via an attachment means to a frame of the mounting device. As shown in FIG. 6, as one configuration example, a boss 1 formed around the output shaft is configured to fit through an opening f1 of the frame f of the mounting device.

The actuator is provided with an engagement means via shock-absorbing member (for example, a spring or rubber which works as a shock-absorbing member) in order to suppress the rotation of the actuator itself with respect to the frame due to the reaction during oscillation. For example, as shown in FIG. 6, this configuration includes a claw portion f2 formed on the frame that engages with an engaging portion a2 having the shock-absorbing member.

In the conventional actuator like this, while the engagement means is configured to be arranged on the outside of the case, a stopper is arranged inside thereof to limit the movement of the rotor. Thus, it is necessary to dispose the shock-absorbing members on both sides independently. However, in such a separate and independent arrangement, there is a possibility that it becomes impossible to secure a sufficient shock absorption in view of the demand for miniaturization of the components.

That is, since the overall weight decreases by miniaturization of the actuator, an inertial force may appear to decrease which also decrease an impact force to shock-absorbing member decrease. However, in actuality, in addition to the narrower arrangement area of the shock-absorbing member, high-power actuators are emerging despite their small size due to use of magnets with high magnetic flux density, the inertial force rather tends to become large. Thus, shock-absorbing member of low volume cannot sufficiently absorb the impact force. Moreover, in miniaturization of the actuator, there is a continuous demand for improved assembly, reliability and durability.

Accordingly, in view of the above problems, it is an object of the present invention to provide an actuator that improves suppression of vibration of the actuator during driving as well as contributes to simplification of the entire structure.

Means for Solving the Problems

In order to realize the above object, the anti-vibration mechanism of the actuator according to the present invention is constituted as follows.

That is, it is characterized in having a rotary actuator comprising: a case; a rotor arranged in the case and oscillates (center oscillation) in a predetermined rotary angle by a driving means; an output shaft that holds the rotor in the case and outputs oscillation force thereof to the outside as axial rotation; a stopper arranged inside the case and limits the movement of the rotor; and an engagement means arranged at an outside of the case and engages the case with an external mounting device: and it is characterized in that a shock-absorbing member is provided which is integrally formed as one continuous piece to both the stopper and the engagement means.

Here, the "stopper" is a contact element arranged on the stroke of the rotor. The "engagement means" is an element to screw in or fit to the frame of a mounting device to counter the reaction force of the rotor that actively oscillates. For instance, it is an element such as a protrusion or an opening provided to the actuator to be inserted, screwed, or to be fitted to concave or convex portions formed on the frame of the mounting device.

For the material of the shock-absorbing member, a material that can absorb or attenuate the pressing force generated when an abrupt contact (collision) to the member by the swing of the rotor can be used, for example, by selecting one or combination of rubber material, foaming material, gel material based on technical standard known in the art. Such collisions occur repeatedly in accordance with the oscillation cycle, and resultant vibration is transmitted to the shock-absorbing member, the case and the mounting device. Therefore, the shock-absorbing member is preferably a flexible material having shock absorption properties as well as a high resilience.

It is to be noted that while the engagement means aims to suppress reaction forces to the actuator from the mounting device and is separately configured from the mounting means (or securing means), the configuration is not limited to this and may be configured to be integrally formed to serve both as mounting means and engagement means. For example, although not shown, it may be configured to hold the actuator itself by a screw for the engagement means.

Next, the arrangement of the shock absorbing member in the second aspect of the invention has a configuration covering a contact member of the stopper and a contact member of the engagement means as one continuous piece of a unitary body. That is, although the stopper and the engagement means are formed separately, the shock-absorbing member arranged to their contact members is formed integrally.

Here, the "contact member of the stopper" refers to a part of the stopper which comes into contact with the rotor. Further, "the contact member of the engagement means" refers to a part at which the engagement means of the above configuration contacts with the mounting device.

Further, the arrangement of the shock-absorbing member in the third aspect of the invention has a configuration in which either one of the stopper or the engagement means is formed as a body of a shock-absorbing member, and the shock-absorbing member formed integrally with the body covers a contact surface of the other.

Here, "to cover the other contact surface" refers to a configuration that covers the overall surface of the stopper or the engagement means, as well as a configuration that covers only a part of the contact member that is a part of the surface of the stopper or the engagement means. Namely, it means that the portion to be covered by the shock-absorbing member is at least a contact member of the stopper or the engagement portion.

Further, the arrangement of the shock-absorbing member in the fourth aspect of the invention has a configuration in which both the stopper and the engagement means are integrally formed with the shock-absorbing member. That is, unlike the configurations specified in the second and third aspects of the invention which covers the contact member by the shock-absorbing member, a machine element itself, which is configured to have both a stopper function and engagement means, is formed by the shock-absorbing member.

In general, for the power source for the drive means of the actuator, an electromagnetic force, hydraulic, pneumatic, etc. are used. The present invention is applicable to the actuator using any one of those power sources. In particular, the present invention is suitable for rotary oscillation by an electromagnetic force. The basic configuration for the rotary oscillation of the rotor by an electromagnetic force has the configuration in which oscillation occurs by the electromagnetic interactions by repeated changing of the fixed magnetic field generated by a permanent magnet arranged on the rotor side and the magnetic force and magnetic field from the electromagnetic coil that is laid oppositely to the permanent magnet.

Effects of the Invention

Since the anti-vibration mechanism of the actuator according to the present invention is configured as described above, the following effects can be obtained.

That is, according to the configuration of the first aspect of the invention, because the shock-absorbing member is formed as one continuous piece, the shock wave generated by the contact of the stopper and the shock wave generated by the reaction to the contact of the engaging means are both propagated inside of the shock-absorbing member of the unitary piece, and each of the shock waves effects to interfere to attenuate or cancel each other. That is, the occurrence point of the impact from the actively oscillating actuator is at the turning points, i.e., impacts to the stopper by the rotor. The reaction force from the stopper by this impact is transmitted to the engagement means from the rotor through the case, which will act as a rapid pressing force to the shock-absorbing member. The repeated occurrence of this will result in a vibration with a specific amplitude.

In other words, the occurrence of the shock wave due to rapid deflection at the time of impact to the stopper and the occurrence of the shock wave due to transmission to the engaging means of the reaction forces can be seen to occur substantially simultaneously in time (due to short transmission distance). Then, the deflection occurs simultaneously with separation between two points in the unitary body, which can be considered to cancel or attenuate the two shock waves generated from each point due to canceling out and interference by each other. Under this assumption, the shock-absorbing member according to the present invention has much improved vibration control property, vibration absorption, and vibration cancellation compared to the conventional configuration.

Moreover, because the shock-absorbing member of the stopper and the shock-absorbing member of the engaging means, which have been separately arranged in the prior art, are formed as a unitary body, the capacity of the shock-absorbing member can be increased in comparison to the conventional technology, and thus more effective vibration absorption can be expected.

Furthermore, in view of the demand for miniaturization, a ratio of the shock-absorbing member with respect to the overall actuator can be increased, and attenuation and absorption of vibration can be enhanced. In other words, while the mass and the inertial force is reduced due to the miniaturization of the actuator, the proportion of the shock-absorbing member increases, and the absorption efficiency of the vibration can be enhanced.

Furthermore, because of the unitary body, the shock-absorbing member can be disposed from the outside proceeding to the inside to form a contact member of the stopper. Thus, the shock-absorbing member can be arranged from the outside of the case after assembling of the rotor and the case that requires high accuracy. This can serve to increase the assembling accuracy as well as to facilitate exchange and material replacement of the shock-absorbing member, thereby improving durability and maintenance property of the actuator.

Of course, the unitary body leads to reduction of the number of components, and can shorten the production cycle due to quick installation, and can also contribute to reduction of component costs and production costs.

EMBODIMENTS OF THE INVENTION

In the following, embodiments 1 and 2 of an actuator arranged with the vibration-control mechanism of the present invention are described in detail with reference to the accompanying drawings.

Embodiment 1

Figure 1:
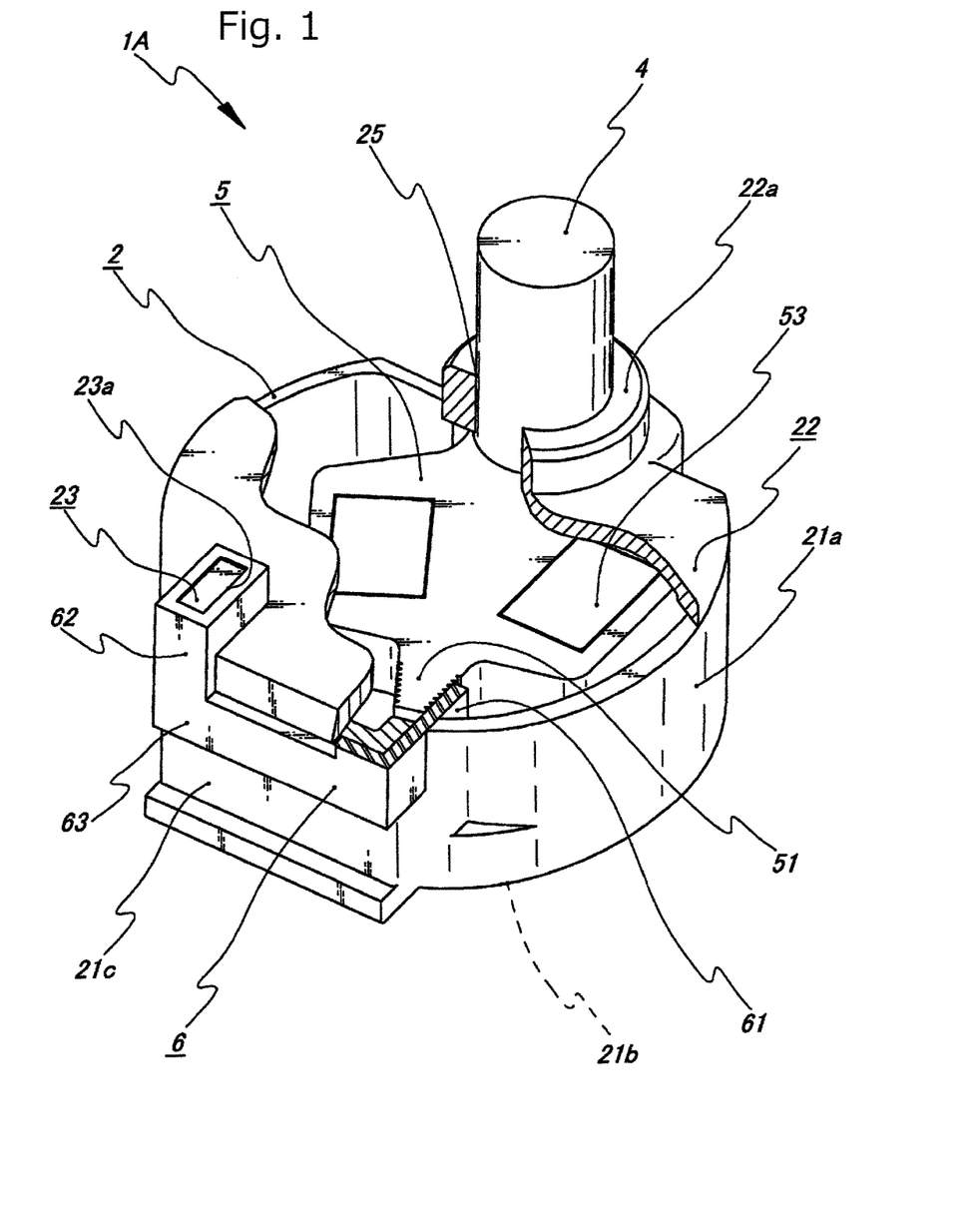
FIG. 1 is a partially cut-out perspective view illustrating the actuator according to an embodiment 1.
Figure 2:
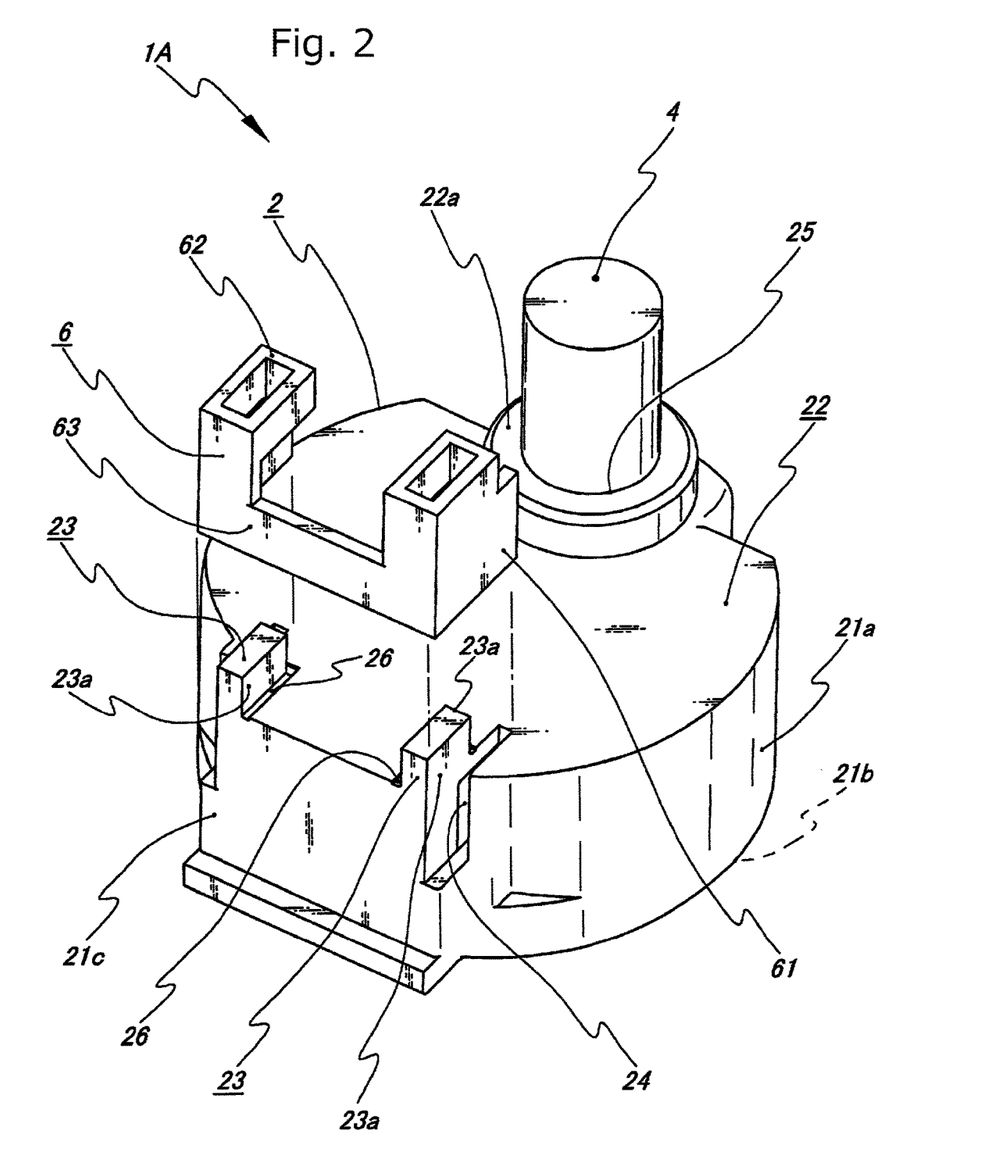
FIG. 2 is a perspective view showing the actuator according to the embodiment 1.

First, an actuator 1A according to the embodiment 1 will be described.

The actuator 1A is configured with: a case 2 having a protrusion 23 as an engaging means for engaging the frame f of the mounting device; an electromagnetic coil 3 that is a component of a driving means and is arranged on the inner side of the case 2; a rotor 5 including permanent magnets 52 facing an electromagnetic coil 3 with a predetermined gap; an output shaft 4 that supports the rotor 5 in a cantilevered manner as well as outputs the swinging force of the rotor 5 to the outside; a stopper 61 defining a movement of the rotor 5; and a shock-absorbing member 6 disposed integrally on the stop and the engagement means.

The case 2 shown in the drawings is comprised of a main body 21 having upper open (upward) and a bottomed cylindrical body, and a lid 22 that is compatible with the opening of the upper part of the main body 21, thereby configuring a sealed box shape having an internal cavity by closing of the lid 22. The lid 22 is provided with a through-hole 25 through which the output shaft 4 penetrates, and a slit 24 formed by partially cutting the surrounding of the protrusion 23 in a groove-like manner. Further, a boss 22a which engages with a through hole f3 of the frame f of the mounting device is provided with a shape formed by building a ring around the edge of the through hole 25.

Two rectangular columnar protrusions 23, 23 are oppositely laid at a predetermined interval at a side wall 21a of the main body 21 of the case 2 opposite to the penetration position of the output shaft 4. The protrusion 23 serves as an engagement means with the frame f of the mounting device, and its periphery is covered with the shock-absorbing member 6. Around the base of the protrusion 23, a notched groove 26 is formed in the lid 22 and the side wall 21a, and a slit 24 is formed contiguously to the groove 26 to penetrate into the case.

Near the center on the inner bottom surface 21b of the case body 21 is arranged with an electromagnetic coil 3 of a cylindrical shape and a predetermined height. The output shaft 4 is disposed in the erected state at a position not interfering with the electromagnetic coil 3. The output shaft 4 serves as an output shaft of the actuator 1A, and is configured to be rotatable with respect to the lid 22.

In the present embodiment, the output shaft 4 is a convex unit extending to the outside from the case. However, it can be a concave unit without extending to the outside (not shown). In such a situation, an input shaft of the mounting device will be fitted to the fitting portion for driving force.

Figure 3:
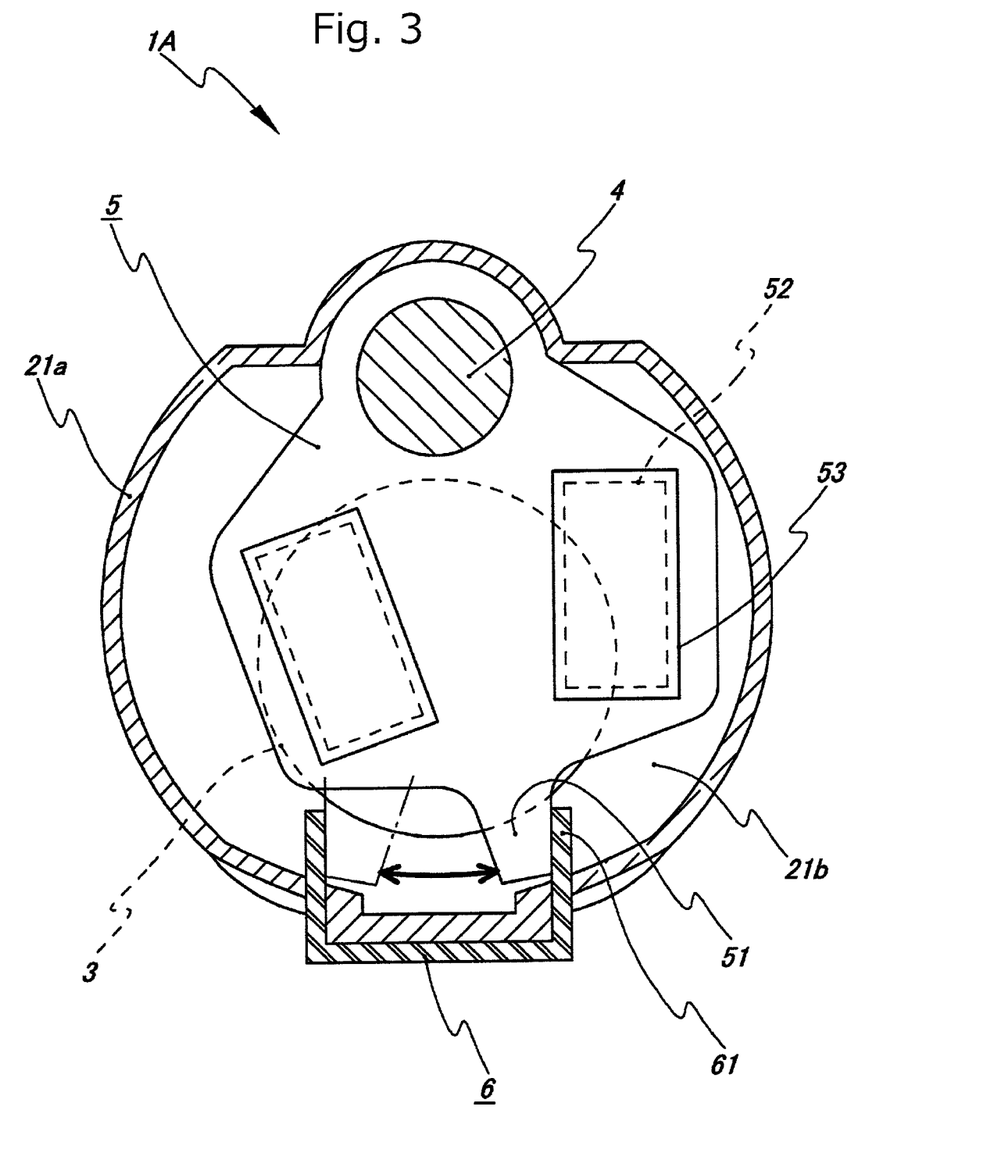
FIG. 3 is a cross-sectional side view of the actuator according to the embodiment 1.

Further, the rotor 5 of the thick plate shape is attached to the output shaft 4 in a cantilevered manner. As shown in FIG. 3, the rotor 5 has a shape of substantially hexagonal in front view. A contact member 51 protruding toward the case wall 21a is integrally formed at a position of one corner of the hexagonal shape opposite to the output shaft 4. In the rotor 5, a permanent magnet 52 facing the electromagnetic coil 3 is disposed and a back yoke 53 is disposed on the back side.

With this configuration, the rotor 5 actively oscillates by a predetermined rotary angle by an electromagnetic interaction between the electromagnetic coil 3 and the permanent magnet 52, and the swing force from the output shaft 4 is supplied to the outside as an output.

Next, the shock-absorbing member 6 serving as a principal object according to the present invention will be described.

The shock-absorbing member 6 is integrally formed by: two contact portions 62 and 62 each having a rectangular cylindrical shape that are oppositely laid; a strip-like connecting portion 63 which connects the contact portions 62; a stopper 61 that extends from the lower outer portion of each of the contact portions 62 and further extends to be counter to and perpendicular with the extending direction of the connecting portion 63 (arrangement direction of output shaft 4). In the embodiment, the shock-absorbing member 6 is formed of rubber material (hereinafter referred to as "vibration-proof rubber") that alleviates or absorbs vibrations and impacts.

The shock-absorbing member 6 formed as above is arranged so that the contact portions 62 each having a tubular shape is mounted so as to fit from above the protrusions 23 in a state in which the main body 21 is closed with the lid 22. In this situation, the connecting portion 63 is substantially in close contact with a flat wall 21c formed on the side wall 21b of the case body 21 at a position opposite to the output shaft 4, and is properly retained in conformance with the notched groove 26. Also, due to this attachment, the stopper 61 is inserted through the gap of the slit 24 and is held at a predetermined position. Thus, the case 2 is sealed as the stopper 61 fits to the slit 24.

The protrusions 23 as shown are fitted into the engagement opening f3 of the frame f when the actuator is assembled with the mounting device. Accordingly, the actuator 1A is prevented from relative rotation against the frame f caused by reaction forces of the rotary movement of the rotor 5.

The protrusion 23s as the engaging means, by being attached with the shock-absorbing member 6 as described above, are covered at the contact portions 23a with the shock-absorbing member 6. This allows to mitigate transmission of reaction forces (rotational force in the reverse direction to the rotation direction of the rotor) from the rotor 5 via the shock-absorbing member 6 by avoiding direct contacts between the protrusions 23 and the frame f of the mounting device.

Further, the stopper 61 disposed at a predetermined position in the inside of the case 2 limits the movement of the rotor 5 by colliding with the contact member 51 of the rotor 5. Further, since the stopper 61 is formed by the shock-absorbing member 6, it can alleviate or absorb the impact of the collision. As to a layout arrangement of the stopper 61 constituting the shock-absorbing member 6 functioning as a stopper, it is appropriately determined depending on a desired rotary oscillation angle of the rotor 5 and arrangement of the contact member 51 (1 or 2 points arrangement) in relation to the rotor 5.

Figure 4:
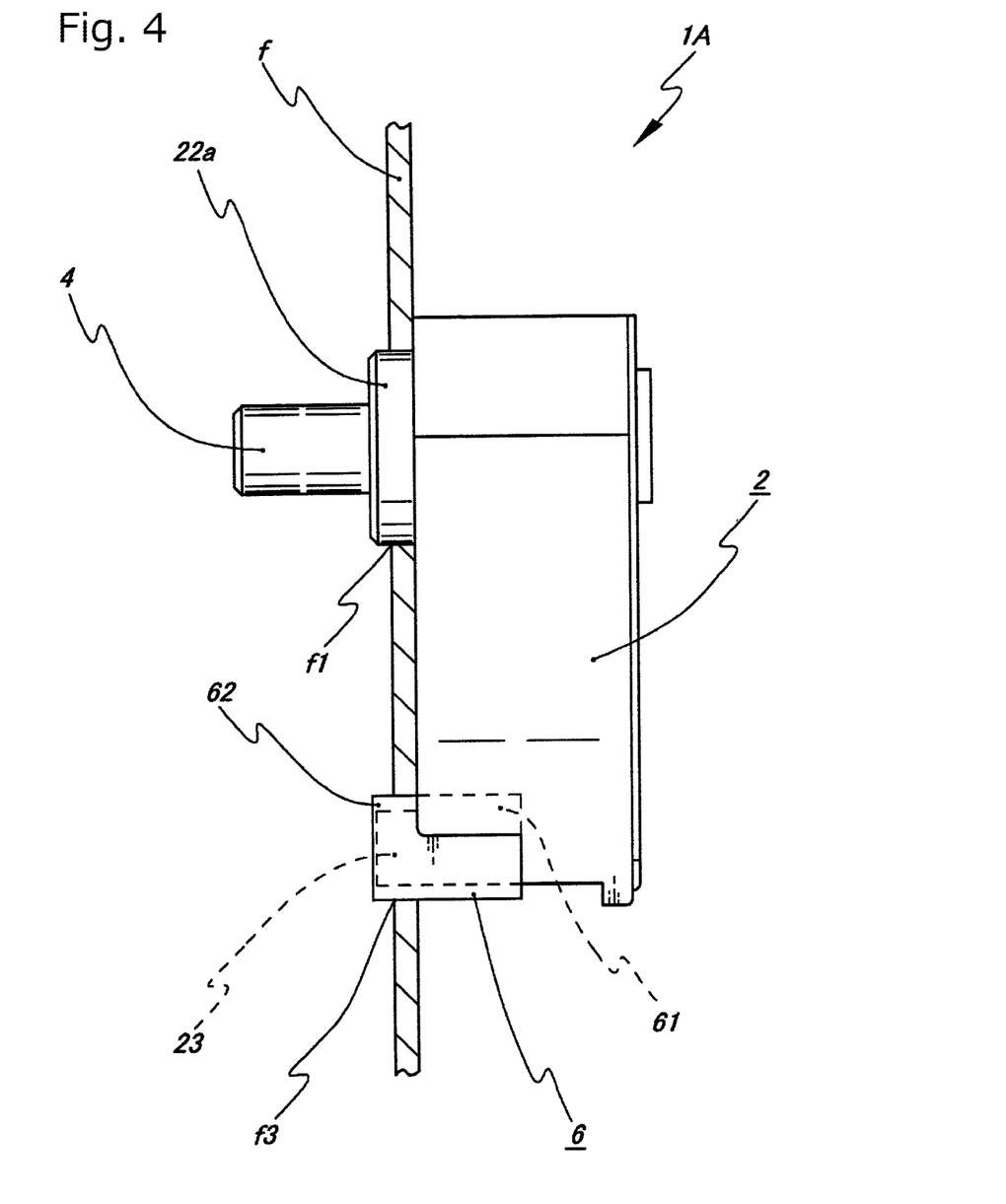
FIG. 4 is a side view of the actuator according to the embodiment 1.

Further, the boss 22*a* of the case 2 formed around the output shaft, as shown in FIG. 4, is configured to engage with the frame f of the mounting device, similar to the protruding member 23 and the contact member 62. The boss 22*a* retains and positions the actuator 1*a* as a whole. On the other hand, the protrusion 23 and shock-absorbing member 6 constituting as engagement means function to prevent the relative rotation by the reaction forces of the actuator 1A as well as to suppress the vibration.

In the actuator 1A according to the present invention, by arranging the shock-absorbing member 6 as described above, the shock-absorbing member of the protrusion 23, which conventionally would need to be separately provided from the shock-absorbing member of the stopper 61, can not only be integrally formed, and but also makes it possible to omit a stopper of stiff material.

Here, description will be made as to the basic configuration of the drive means of the actuator 1A configured as described above.

The drive means of the actuator 1A is a common technology and details thereof are disclosed in the Patent Document 1 by the present applicant, and therefore its detailed description will be omitted.

Thus, the outline of the configuration used in this embodiment is as follows.

In the actuator 1A, in the case of a non-energized state, the rotor 5 maintains a stopped state by the magnetic attraction between one of the permanent magnets 52 and the core (not shown) of the electromagnetic coil 3, and by the restriction of the stopper 61. Next, when an electric current is introduced to the electromagnetic coil 3, and the electromagnetic coil 3 is energized thereby generating a magnetic force. Thus, the rotor 5 moves to the opposite direction when energized magnetic force exceeds the magnetic force of the permanent magnet 52 which has been attracted to the core. The coupling/decoupling of the energization to the electromagnetic coil 3 promotes the reciprocating motion of the rotor 5, and the oscillation is outputted from the output shaft 4 as the rotary oscillation force.

Embodiment 2

Figure 5:
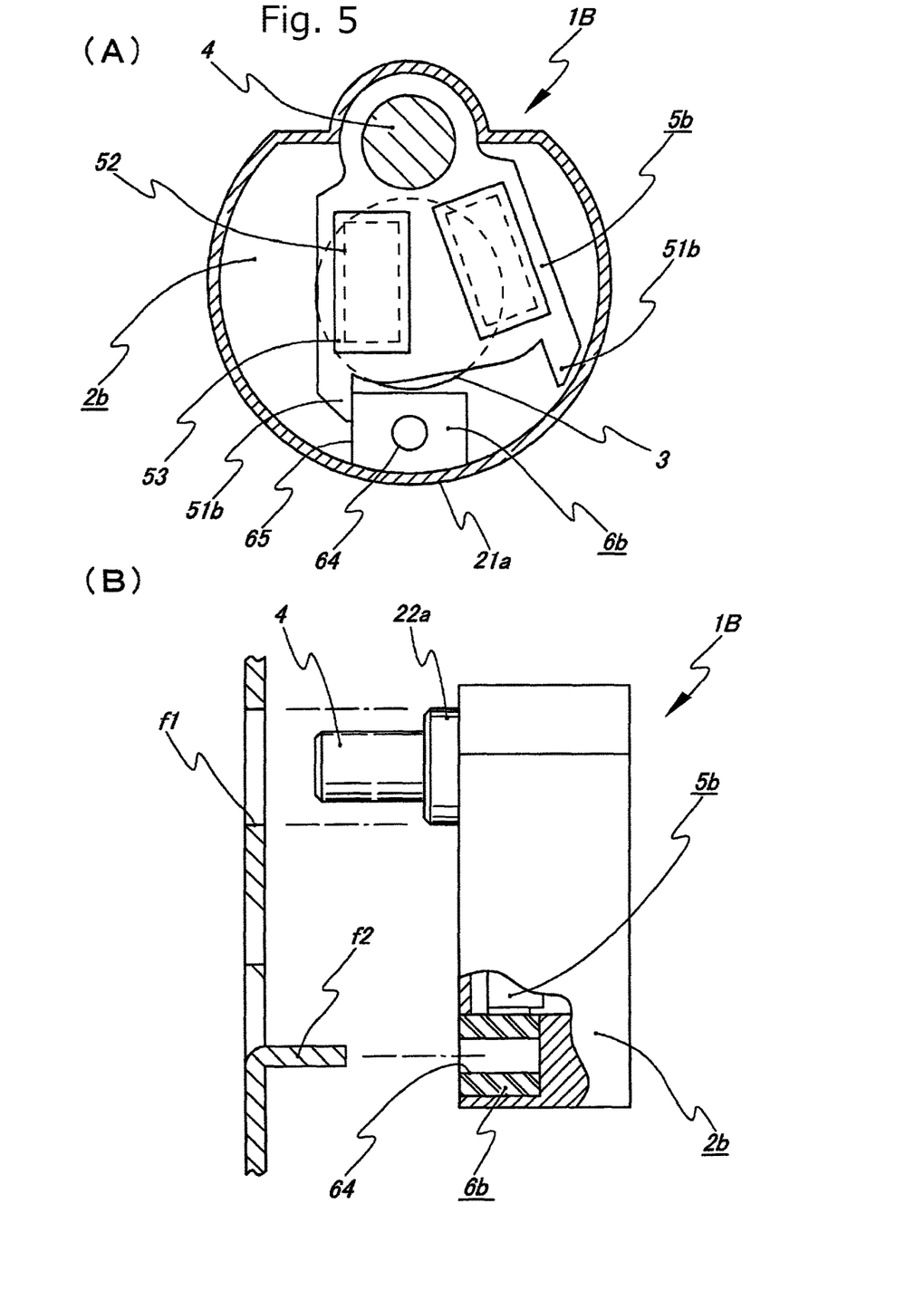
FIG. 5(A) is a cross-sectional side view and FIG. 5(B) is a partially cut-out side view respectively showing the actuator of an embodiment 2.

Next, the actuator 1B of an embodiment 2 will be described. Constituent elements having the same functionality as those in the actuator 1A of the embodiment 1 are designated by the same reference numerals, and detailed description thereof is omitted.

The actuator 1B shown in FIG. 5 is a modified example of the actuator 1A of the embodiment 1, which has a different configuration of a case 2*b*, rotor 5*b* and a shock-absorbing member 6*b*.

The shock-absorbing member 6*b* used in the actuator 1B is molded as a unitary body in a block shape based on the specification to function as the stopper and an engagement means described above. The block-shaped shock-absorbing member 6*b* (hereinafter referred to as "block member") has a substantially rectangular body, and is arranged at the side wall 21*a* of the case 2 at a position opposite to the output shaft 4, and is further arranged at the position to interfere with the movement locus of the contact member 51*b* to be described below. In the substantially central position of the block member 6*b*, an insertion hole 64 that is substantially parallel with the axial direction of the output shaft 4 is opened with a predetermined depth. Incidentally, the insertion hole 64 may be a through-hole or a bottomed hole. In addition, although not shown, it may be configured as a male screw or one-way insertion receptor depending on specifications of a mounting device. The block member 6*b* has shoulder portions 65 on both sides of the insertion hole 64 as viewed (drawing) from the front.

Moreover, the case 2 and its inner portion is arranged with the rotor 5*b* cantilevered by the output shaft 4 in the same manner as in the embodiment 1. The rotor 5*b* extending radially (or to the side wall 21*a* of the case 2) with the output shaft 4 as a center has two protruding contact members 51*b* at a predetermined distance.

The block member 6*b* of the embodiment 2 configured as described above has the insertion hole 64 that receives and fits a pawl portion f2 that is bent and protruded from the frame f, which prevents the relative rotary oscillation of the actuator 1B by the reaction force of the swing. The block member 6*b* further includes two contact members 51*b*, 51*b* arranged at a distance that alternately contact with the shoulder portions 65, 65 to function as a stopper. Thus, the rotary angle during the oscillation of the rotor 5*b*, i.e., a reciprocating stroke movement is defined.

As a result, since the block member 6*b* is formed of a shock-absorbing member, the impact force at the time of contact of the contact member 51 and reaction force from the claw portion f2 can be reduced or attenuated.

Due to the above configuration, the block member 6*b* can provide a stopper and an engagement means by an integrally molded body, and secure a sufficient shock-absorbing area for an effective shock-absorbing member even when miniaturized. Moreover, the number of components can be reduced, and assembling efficiency, durability and reliability are improved, and further economical effects such as reduction of the component cost and manufacturing cost can also be expected.

DESCRIPTION OF REFERENCE SYMBOLS

1A actuator of embodiment 1
1B actuator of embodiment 2
2, 2*b* case
  23 protrusion (engagement means)
3 electromagnetic coil (component of drive means)
4 output shaft
5, 5*b* rotor
  51, 51*b* contact member
6 shock-absorbing member
6*b* block member (shock-absorbing member of embodiment 2)
  61 stopper
  62 contact portion
  63 connecting portion
  64 insertion hole
  65 shoulder portion

What is claimed is:

1. A rotary actuator oscillation control mechanism for a rotary actuator comprising:
   a case;
   a rotor arranged in the case and oscillates in a predetermined rotary angle by a driving means;
   an output shaft that holds the rotor in the case and outputs oscillation force thereof to the outside as axial rotation;
   a stopper arranged inside the case and limits the movement of the rotor; and
   an engagement means arranged at an outside of the case and engages the case with an external mounting device;

the rotary actuator oscillation control mechanism is characterized in that a shock-absorbing member is integrally formed as one continuous piece to both the stopper and the engagement means.

2. The rotary actuator oscillation control mechanism according to claim 1 characterized in that the shock-absorbing member is configured to cover a contact member of the stopper and a contact member of the engagement means as one continuous piece.

3. The rotary actuator oscillation control mechanism according to claim 1 characterized in that the shock-absorbing member is configured such that either one of the stopper or the engagement means is formed as a body of the shock-absorbing member, and the shock-absorbing member formed integrally with the body while covering a contact surface of the other.

4. The rotary actuator oscillation control mechanism according to claim 1 characterized in that both the stopper and the engagement means are integrally formed by the shock-absorbing member.

* * * * *